United States Patent
Yum et al.

(10) Patent No.: US 10,397,936 B2
(45) Date of Patent: Aug. 27, 2019

(54) METHOD FOR RECEIVING CONTROL INFORMATION FOR MULTIPLE COMPONENT CARRIER GROUPS AND DEVICE THEREFOR

(71) Applicant: LG ELECTRONICS INC., Seoul (KR)

(72) Inventors: Kunil Yum, Seoul (KR); Suckchel Yang, Seoul (KR); Seungmin Lee, Seoul (KR); Daesung Hwang, Seoul (KR); Hyunho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 152 days.

(21) Appl. No.: 15/528,036

(22) PCT Filed: Dec. 2, 2015

(86) PCT No.: PCT/KR2015/013083
§ 371 (c)(1),
(2) Date: May 18, 2017

(87) PCT Pub. No.: WO2016/089119
PCT Pub. Date: Jun. 9, 2016

(65) Prior Publication Data
US 2018/0338318 A1    Nov. 22, 2018

Related U.S. Application Data

(60) Provisional application No. 62/087,241, filed on Dec. 4, 2014.

(51) Int. Cl.
*H04L 12/28* (2006.01)
*H04W 72/12* (2009.01)
(Continued)

(52) U.S. Cl.
CPC ......... *H04W 72/1205* (2013.01); *H04J 11/00* (2013.01); *H04L 5/00* (2013.01);
(Continued)

(58) Field of Classification Search
CPC ...................................................... H04L 12/28
(Continued)

(56) References Cited

U.S. PATENT DOCUMENTS

| 2012/0051306 A1 | 3/2012 | Chung et al. |
| 2014/0133440 A1 | 5/2014 | Zhang et al. |

(Continued)

FOREIGN PATENT DOCUMENTS

| WO | 2012108688 | 8/2012 |
| WO | 2013009109 | 1/2013 |

OTHER PUBLICATIONS

PCT International Application No. PCT/KR2015/013083, Written Opinion of the International Searching Authority dated Mar. 11, 2016, 21 pages.

*Primary Examiner* — Dang T Ton
(74) *Attorney, Agent, or Firm* — Lee, Hong, Degerman, Kang & Waimey PC

(57) ABSTRACT

An embodiment of the present invention relates to a method for receiving control information by a user equipment (UE) having multiple component carrier groups configured therefor in a wireless communication system. The method may comprise the steps of: receiving, from a base station, configuration information on the transmission of main control information which comprises common control information for individual component carrier groups; and attempting to detect main control information for each of the multiple component carrier groups and sub-control information comprising individual component carrier-specific control information, using the configuration information, wherein the (Continued)

configuration information may comprise information on the transmission cycle and transmission offset of the main control information for each of the multiple component carrier groups.

18 Claims, 15 Drawing Sheets

(51) Int. Cl.
*H04J 11/00* (2006.01)
*H04L 5/00* (2006.01)
*H04W 72/04* (2009.01)
*H04B 7/0413* (2017.01)
*H04L 27/26* (2006.01)

(52) U.S. Cl.
CPC ............ *H04L 5/001* (2013.01); *H04L 5/0094* (2013.01); *H04W 72/0453* (2013.01); *H04B 7/0413* (2013.01); *H04L 27/2602* (2013.01)

(58) Field of Classification Search
USPC ........................................................ 370/329
See application file for complete search history.

(56) References Cited

U.S. PATENT DOCUMENTS

2014/0169312 A1    6/2014  Wang et al.
2018/0160440 A1*   6/2018  Hosseini ........... H04W 72/1226

* cited by examiner

METHOD FOR RECEIVING CONTROL INFORMATION FOR MULTIPLE COMPONENT CARRIER GROUPS AND DEVICE THEREFOR

CROSS-REFERENCE TO RELATED APPLICATIONS

This application is the National Stage filing under 35 U.S.C. 371 of International Application No. PCT/KR2015/013083, filed on Dec. 2, 2015, which claims the benefit of U.S. Provisional Application No. 62/087,241, filed on Dec. 4, 2014, the contents of which are all hereby incorporated by reference herein in their entirety.

TECHNICAL FIELD

The present invention relates to a wireless communication system, and more particularly, to a method of receiving control information on a plurality of component carrier groups and an apparatus therefor.

BACKGROUND ART

DISCLOSURE OF THE INVENTION

Technical Task

Various devices including a smartphone, a tablet PC, and the like requiring M2M (machine-to-machine) communication and high data throughput and technologies are emerging and diffusing. Hence, an amount of data required to be processed in a cellular network is rapidly increasing. In order to satisfy the rapidly increasing data process requirements, a carrier aggregation technique for efficiently using more frequency bands, a cognitive radio technology, a multi-antenna technology for increasing data capacity transmitted in a limitative frequency, a multi-base station cooperative technology, and the like are developing. Moreover, a communication environment is evolving into a way that a density of a node capable of being accessed by a neighboring device is increasing. A node corresponds to a fixed point equipped with one or more antennas to transceive a radio signal with a user device. If a communication system is equipped with a node of high density, the communication system can provide a user device with a communication service of better performance via cooperation between nodes.

A multi-node cooperative communication system performs communication with a user device using the same time-frequency resource in a plurality of nodes. In the multi-node cooperative communication system, since each node operates as an independent base station, the multi-node cooperative communication system has significantly better performance in processing data compared to a legacy communication that performs communication with a user device without mutual cooperation.

The multi-node system performs cooperative communication using a plurality of nodes each of which operates as a base station, an access point, an antenna, an antenna group, a radio remote header (RRH), or a radio remote unit (RRU). Unlike a legacy centralized antenna system that antennas are located in a manner of being concentrated on a base station, in general, a plurality of the nodes are located in a manner of being apart from each other in the multi-node system. One or more base stations or a base station controller can manage a plurality of the nodes to control an operation of each node or schedule data to be transmitted/received by each node. A node is connected with the base station or the base station controller controlling the node via a cable or a dedicated line.

Since the multi-node system is able to communicate with a single user device or a plurality of user devices in a manner that distributed nodes transmit/receive a different stream at the same time, the multi-node system can be regarded as a sort of MIMO (multiple input multiple output) system. However, since the multi-node system transmits a signal using nodes distributed to various positions, a transmission area to be covered by each antenna is reduced compared to antennas installed in the legacy centralized antenna system. Hence, compared to the legacy system used to implement MIMO technique in the centralized antenna system, transmit power for transmitting a signal transmitted by each antenna can be decreased in the multi-node system. And, since a transmission distance between an antenna and a user device is shortened, path loss is reduced and fast transmission of data is enabled. In doing so, transmission capacity and power efficiency of a cellular system can be enhanced and communication performance of uniform quality can be satisfied irrespective of a position of a user device in a cell. Moreover, since the base station(s) and the base station controller(s) connected with a plurality of the nodes are participating in transmitting/receiving data in the multi-node system, a signal loss can be reduced in a transmission process. If nodes apart from each other as much as a prescribed distance perform cooperative communication with a user device, correlation and interference are reduced between antennas. In particular, it may be able to obtain high SINR (signal to interference-plus-noise ratio) through the multi-node cooperative communication system.

Because of the merits of the multi-node system, a next generation mobile communication system uses the multi-node system together with the legacy centralized antenna system or uses the multi-node system instead of the legacy centralized antenna system not only to reduce base station expansion cost and maintenance cost of a backhaul network but also to increase service coverage, channel capacity, and SINR.

The present invention relates to a method of receiving control information for a plurality of component carrier groups. An object of the present invention is to provide a method of more efficiently scheduling a system supporting a plurality of component carrier groups using the method of receiving the control information.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for receiving control information by a terminal for which multiple component carrier groups are configured in a wireless communication system, includes the steps of receiving configuration information on transmission of primary control information including common control information for an individual component carrier group from a base station, and attempting to detect primary control information for each of the multiple component carrier groups and secondary control information including individual component carrier specific control information using the configuration information. In this case, the configuration information may include information on a transmission period and a transmission offset of the primary control information for each of the multiple component carrier groups.

Additionally or alternatively, the configuration information may include information on a valid period of the primary control information for each of the multiple component carrier groups.

Additionally or alternatively, the primary control information for each of the multiple component carrier groups may include information on a valid period of each of the primary control information.

Additionally or alternatively, the primary control information for each of the multiple component carrier groups may be valid until next primary control information is received.

Additionally or alternatively, the primary control information for each of the multiple component carrier groups may include a field indicating one or more component carriers scheduled by the primary control information.

Additionally or alternatively, if the primary control information for each of the multiple component carrier groups does not include a field indicating one or more component carriers scheduled by the primary control information, the primary control information may schedule all component carriers belonging to a component carrier group.

Additionally or alternatively, the secondary control information is transmitted in every subframe or is transmitted with a prescribed period of a subframe unit and if the secondary control information is transmitted with the prescribed period, the secondary control information may include secondary control information on the remaining subframes included in the prescribed period.

Additionally or alternatively, the secondary control information may include a field indicating a component carrier to which the secondary control information is applied.

Additionally or alternatively, if there is primary control information not detected by the terminal, the method may further include transmitting a retransmission request of the primary control information to the base station via a specific uplink resource. In this case, the specific uplink resource may include a resource linked with a radio resource on which the secondary control information is detected.

To further achieve these and other advantages and in accordance with the purpose of the present invention, according to a different embodiment, a terminal configured to receive control information on multiple component carrier groups includes an radio frequency (RF) unit and a processor configured to control the RF unit, the processor configured to receive configuration information on transmission of primary control information including common control information for an individual component carrier group, attempt to detect primary control information for each of the multiple component carrier groups and secondary control information including individual component carrier specific control information using the configuration information. In this case, the configuration information may include information on a transmission period and a transmission offset of the primary control information for each of the multiple component carrier groups.

Additionally or alternatively, the configuration information may include information on a valid period of the primary control information for each of the multiple component carrier groups.

Additionally or alternatively, the primary control information for each of the multiple component carrier groups may include information on a valid period of each of the primary control information.

Additionally or alternatively, the primary control information for each of the multiple component carrier groups may be valid until next primary control information is received.

Additionally or alternatively, the primary control information for each of the multiple component carrier groups may include a field indicating one or more component carriers scheduled by the primary control information.

Additionally or alternatively, if the primary control information for each of the multiple component carrier groups does not include a field indicating one or more component carriers scheduled by the primary control information, the primary control information may schedule all component carriers belonging to each component carrier group.

Additionally or alternatively, the secondary control information is transmitted in every subframe or is transmitted with a prescribed period of a subframe unit and if the secondary control information is transmitted with the prescribed period, the secondary control information may include secondary control information on the remaining subframes included in the prescribed period.

Additionally or alternatively, the secondary control information may include a field indicating a component carrier to which the secondary control information is applied.

Additionally or alternatively, if there is primary control information not detected by the terminal, the processor is configured to transmit a retransmission request of the primary control information to the base station via a specific uplink resource and the specific uplink resource may include a resource linked with a radio resource on which the secondary control information is detected.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to more efficiently schedule a plurality of component carrier groups.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
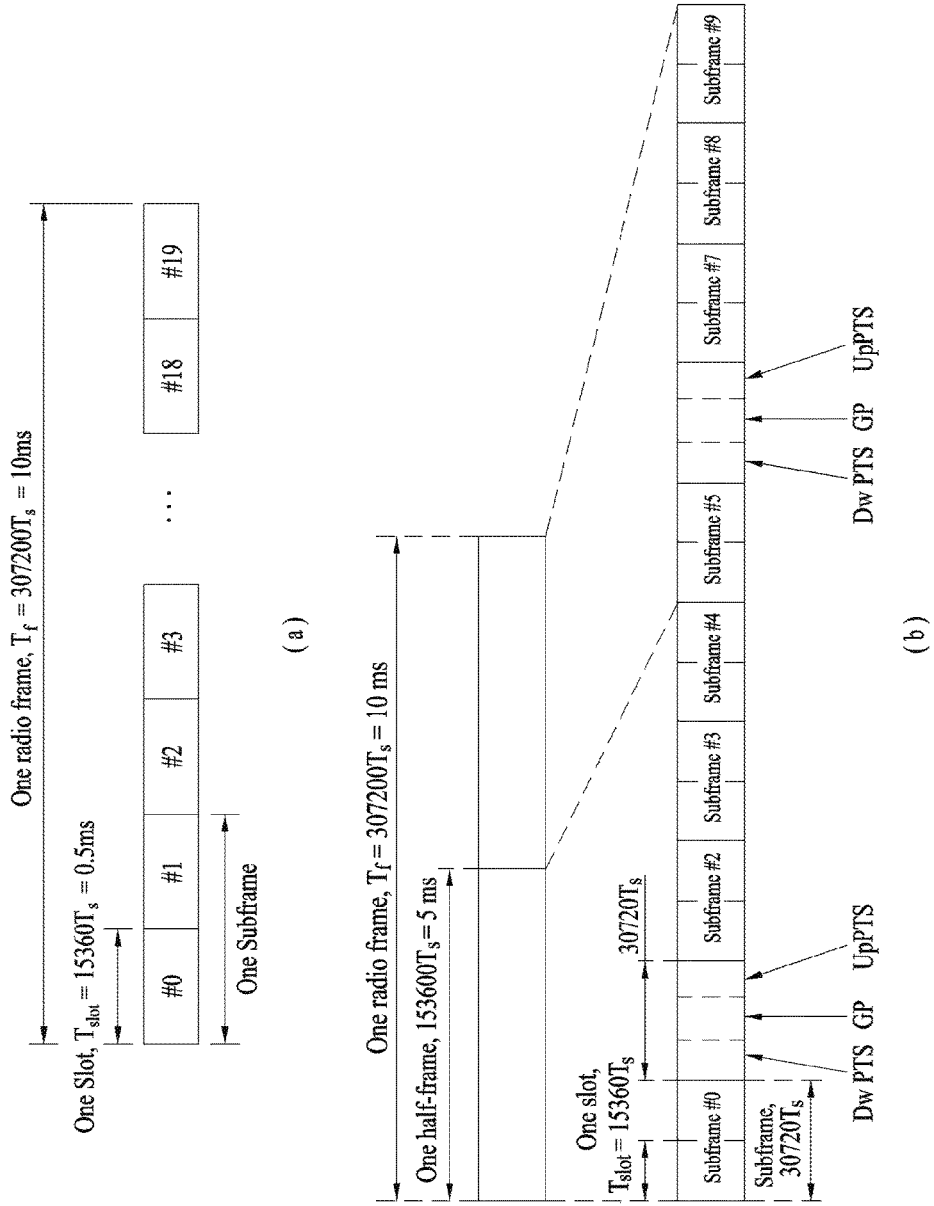
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
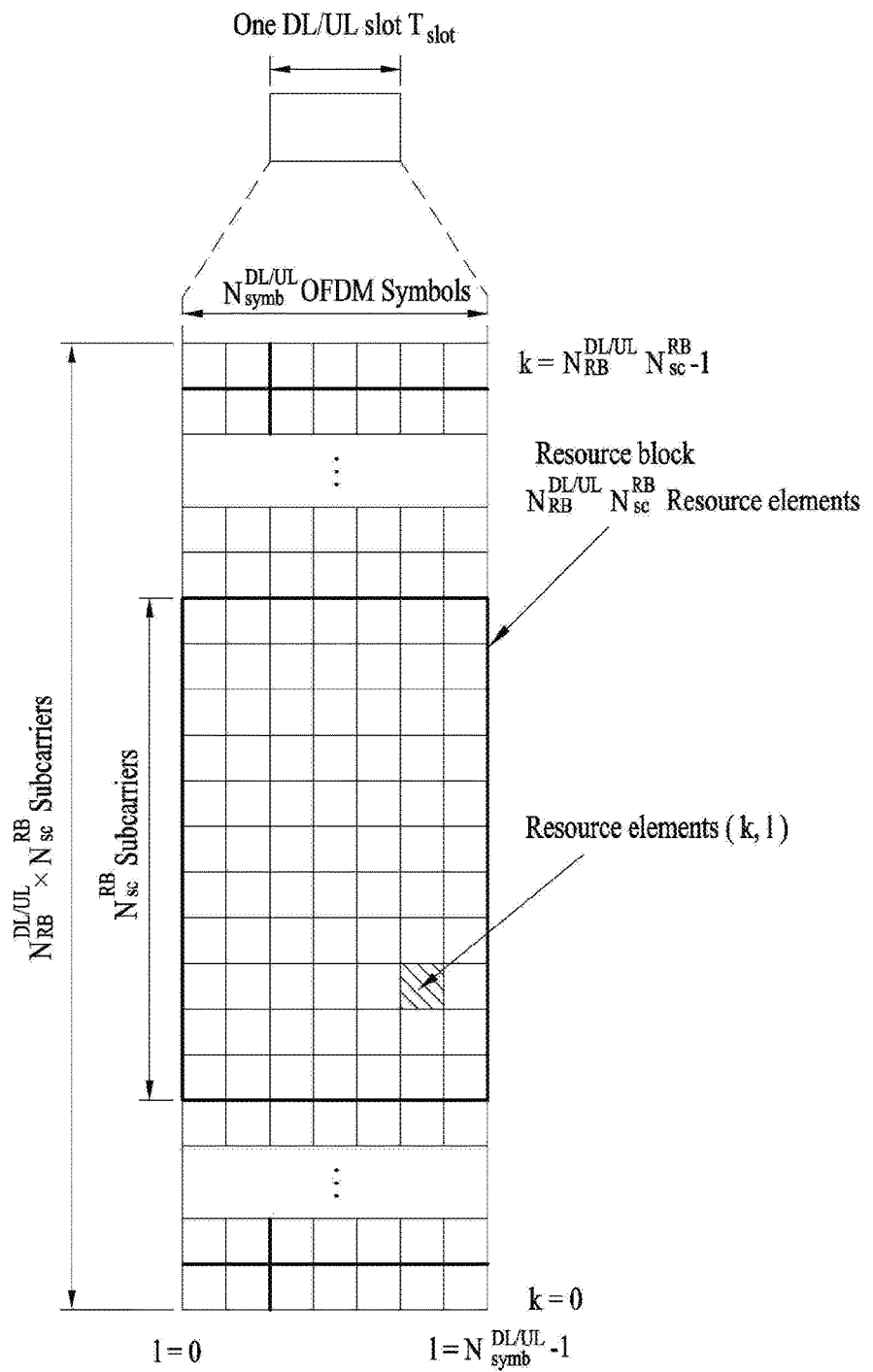
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
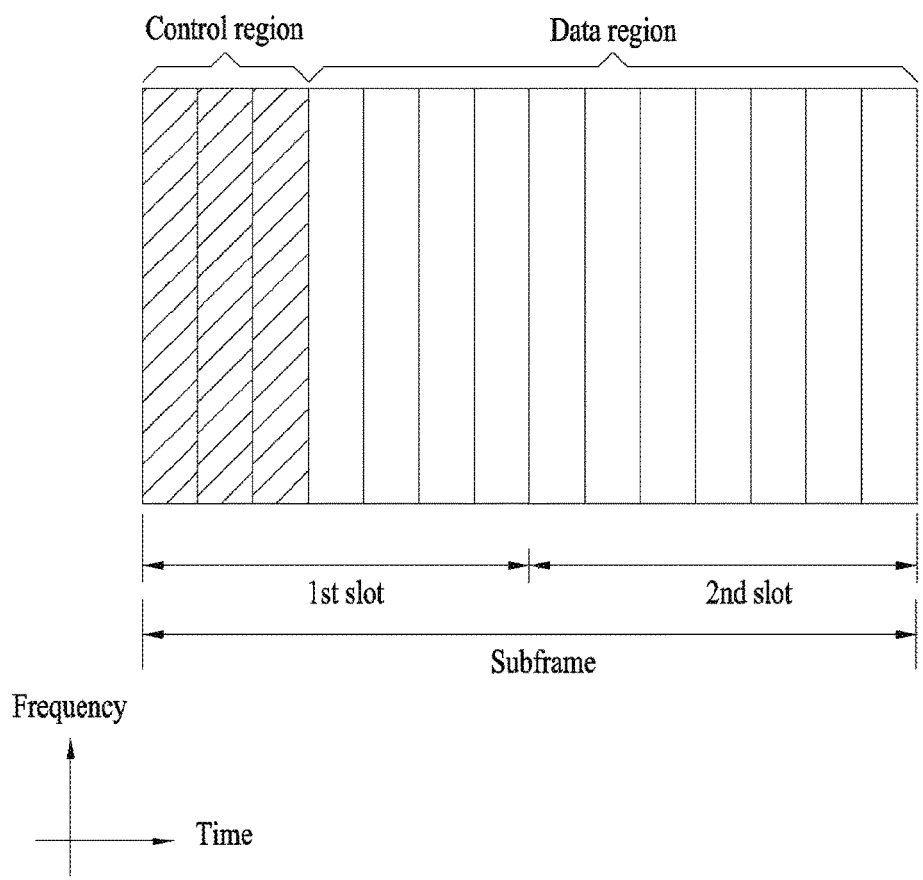
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter.

Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | Number |
| --- | --- | --- |
| Type | Aggregation Level L | Size [in CCEs] | of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
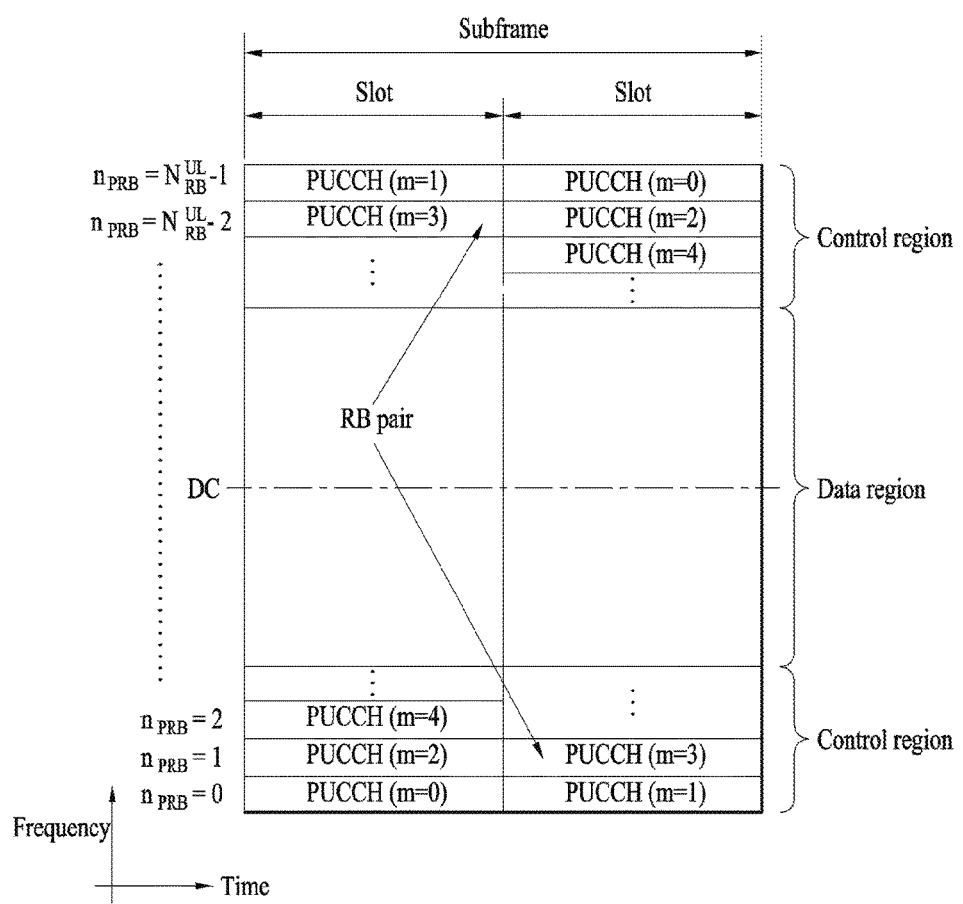
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMFRI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Carrier Aggregation (CA)

Figure 6:
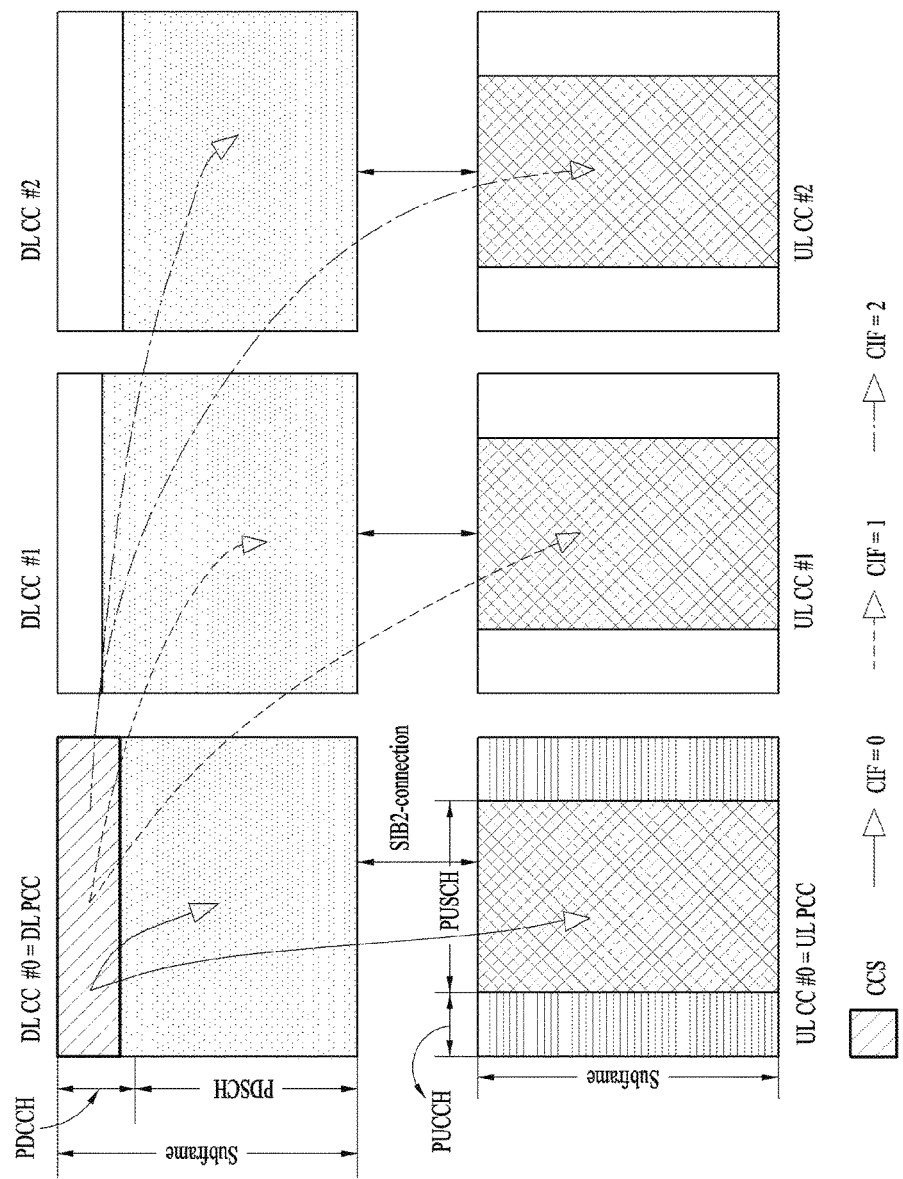
FIG. 6 is a diagram for cross scheduling used in 3GPP LTE/LTE-A system.

Carrier aggregation will hereinafter be described in detail. FIG. 6 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Figure 5:
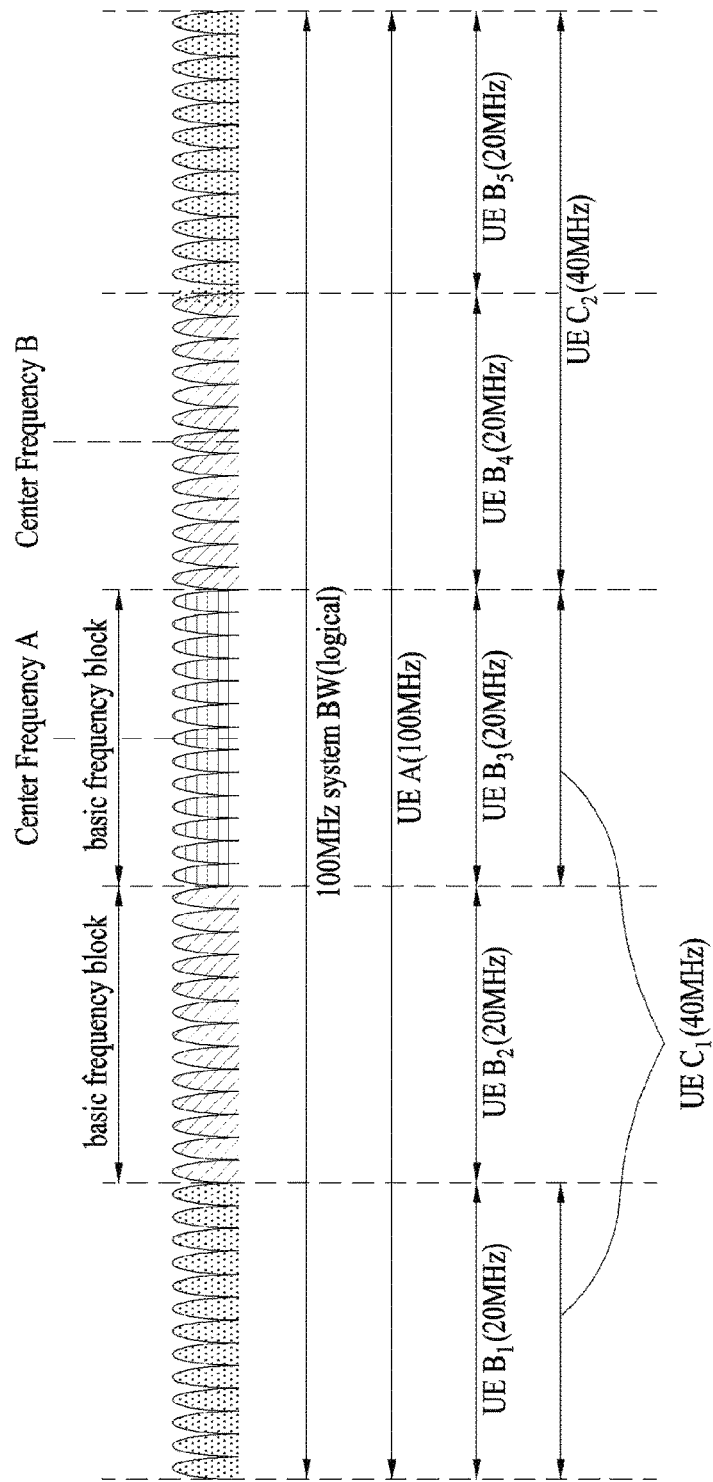
FIG. 5 is a diagram for a carrier used in 3GPP LTE/LTE-A system.

Referring to FIG. 5, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 6, this is only exemplary and the CCs may have different bandwidths. Although the CCs are shown as being contiguous in the frequency domain in FIG. 6, FIG. 6 merely shows the logical concept and thus the CCs may be physically contiguous or separated.

Different center frequencies may be used for the CCs or one common center frequency may be used for physically contiguous CCs. For example, in FIG. 6, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs B1 to B5 may only use a bandwidth of 20 MHz and perform communication using one CC. Each of UEs C1 and C2 may use a bandwidth of 40 MHz and perform communication using two CCs. The two CCs may be contiguous or non-contiguous. The UE C1 uses two non-contiguous CCs and the UE C2 uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

FIG. 6 is a conceptual diagram of a cross carrier scheduling scheme. Specifically, as can be seen from FIG. 6, the number of cells (or CCs) allocated to a relay node (RN) is set to 3, cross carrier scheduling is carried out using a CIF as described above. In this case, it is assumed that a downlink cell (or CC) #0 and a uplink cell (or CC) #0 is set to a primary downlink CC (i.e., a primary cell PCell) and a primary uplink downlink CC, and the remaining CCs are used as secondary cells (S Cells).

In such a next generation system as LTE-A, and the like, it may be able to use a carrier aggregation (CA) technique to improve a transmission speed using bands different from each other at the same time. The CA can be performed using maximum 5 CCs in a legacy system until LTE In a next generation system, when carriers are aggregated, an enhanced CA technique using multiple CCs (e.g., 16 or more CCs) is considering.

In the CA using multiple CCs, it is necessary to configure DCI (downlink control information) for transmitting control information according to a CC. DCI for a CC may be transmitted to PDCCH of the CC. Or, all DCI for a CC or DCI on CCs belonging to a specific CC group may be transmitted to PDCCH of a specific CC (e.g., Pcell). As mentioned in the foregoing description, the latter one is defined as cross-carrier scheduling. In the following, the cross-carrier scheduling is explained.

In a legacy LTE (Rel-8/9) and LTE-A (Rel-10/11) system, a single DL/UL data may be scheduled only by a single DL/UL grant DCI and the DL/UL data may be transmitted through a single DL/UL subframe ("single-SF scheduling"). Meanwhile, in a future LTE system, it may consider using "multi-SF scheduling" scheme for simultaneously scheduling a plurality of DL/UL data via a single DL/UL grant DCI to enhance efficiency and the like. In this case, a plurality of the DL/UL data may have a structure of being sequentially transmitted via a plurality of specific DL/UL SFs.

In case of performing cross-carrier scheduling in such an environment as an enhanced CA (hereinafter, eCA), a space for transmitting DCI for multiple CCs is insufficient. Hence, all or a part of the DCI is transmitted with a certain period to transmit the DCI for multiple CCs. In this case, each DCI includes control information on one or more SFs. In particular, if control information common to each CC is gathered and the control information is transmitted using single DCI, it may be able to more efficiently use the control information. As mentioned above, it may consider a method of transmitting control information common to CC and control information for an individual CC using a different period.

Basic Structure

DCI for eCA is mainly divided into two types of DCI. One is primary-DCI (P-DCI) and the other is secondary-DCI (S-DCI).

P-DCI

The P-DCI includes information common to a CC group to which one or more CCs belong thereto and may be transmitted with a relatively long period (e.g., 4 subframes). In order to configure the P-DCI, a base station may transmit information described in the following to a UE via signaling such as RRC.

P-DCI transmission period
P-DCI transmission offset

The information mentioned above may be transmitted as an individual parameter. Or, the base station may transmit such a single index as P-DCI-SubframeConfig($I_{P\text{-}DCI}$) described in the following to the UE to inform the UE of both the P-DCI transmission period and the P-DCI transmission offset at the same time.

TABLE 5

| P-DCI-SubframeConfig $I_{P\text{-}DCI}$ | P-DCI periodicity $T_{P\text{-}DCI}$ (subframes) | P-DCI subframe offset $\Delta_{P\text{-}DCI}$ (subframes) |
|---|---|---|
| 0 | 1 | $I_{P\text{-}DCI}$ |
| 1-2 | 2 | $I_{P\text{-}DCI}$-1 |
| 3-6 | 4 | $I_{P\text{-}DCI}$-3 |

The UE determines a subframe at which the P-DCI is to be detected by the UE via the P-DCI transmission period and the offset and performs blind decoding on the P-DCI in the subframe only to reduce blind decoding overhead. In this case, the P-DCI may be configured to be valid until a timing at which next P-DCI is received.

If one or more P-DCIs are configured, each of the P-DCIs includes common information on a different CC-group and may be transmitted at a different timing. In this case, a P-DCI configuration may be transmitted as follows.

P-DCI transmission period according to each CC group
P-DCI transmission offset according to each CC group If necessary, it may be able to include information on a CC group to which each P-DCI is to be applied. In this case, it may be able to identify a CC group to which a corresponding P-DCI is applied according to a timing at which the P-DCI is successfully detected.

In this case, information on a P-DCI valid period may be semi-statically configured via RRC or may be dynamically configured via the P-DCI itself.

S-DCI

The S-DCI has CC-specific control information and the control information has a time-varying characteristic. The S-DCI may be transmitted with a relatively short period (e.g., every subframe). For example, if one P-DCI is configured, a transmission period of the P-DCI corresponds to 4 SFs, a transmission offset of the P-DCI corresponds 0, and S-DCI is transmitted in every subframe, transmission of the P-DCI and the S-DCI may be represented as FIG. 7.

In particular, a UE attempts to perform blind decoding on each CC in every 4 SFs for the P-DCI and attempts to perform blind decoding on each CC in every SF for the S-DCI. In the example, it is assumed that a common search space is used to transmit the P-DCI and a UE-specific search space is used to transmit the S-DCI. Yet, all or a part of the S-DCI may be transmitted using the common search space and/or the P-DCI may be transmitted using the UE-specific search space.

DCI Contents

P-DCI

Figure 8:
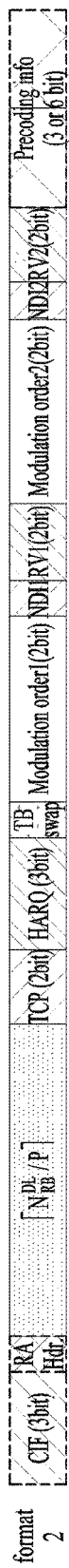
FIG. 8 is a diagram for a configuration of a downlink control information format 2 used in 3GPP LTE/LTE-A system.

P-DCI is common to each CC and it is preferable for the P-DCI to include semi-static control information. Hence, as shown in FIG. 8, the P-DCI may indicate the entire CCs, a scheduling target CC belonging to a CC group corresponding to the P-DCI, and at least one common field (including RA). In particular, scheduling/control information transmitted via the P-DCI may be commonly applied to the indicated scheduling target CC. FIG. 8 shows an example of a DCI format 2 in LTE Rel-10. If a bandwidth of each CC corresponds to 10 MHz and all CC use the DCI format 2, P-DCI contents may be represented as FIG. 9. According to FIG. 9, the P-DCI may include a resource allocation field and a field indicating a scheduling target CC.

Figure 9:
FIG. 9 is a diagram for a configuration of main control information according to one embodiment of the present invention.

In FIG. 9, maximum 16 CCs are assumed to be the scheduling target CC of the P-DCI and information on whether or not each CC is scheduled may be indicated by a bitmap. A size of the bitmap may vary according to a size of a P-DCI target CC group which is determined via RRC and the like in advance.

Figure 10:
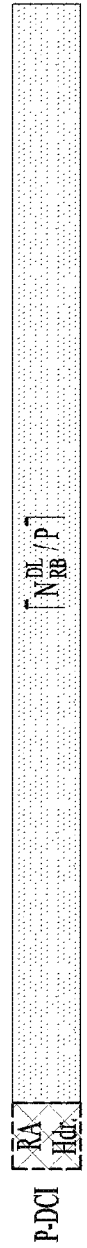
FIG. 10 is a diagram for a configuration of main control information according to one embodiment of the present invention.
Figure 11:
FIG. 11 is a diagram for a configuration of secondary control information according to one embodiment of the present invention.
Figure 12:
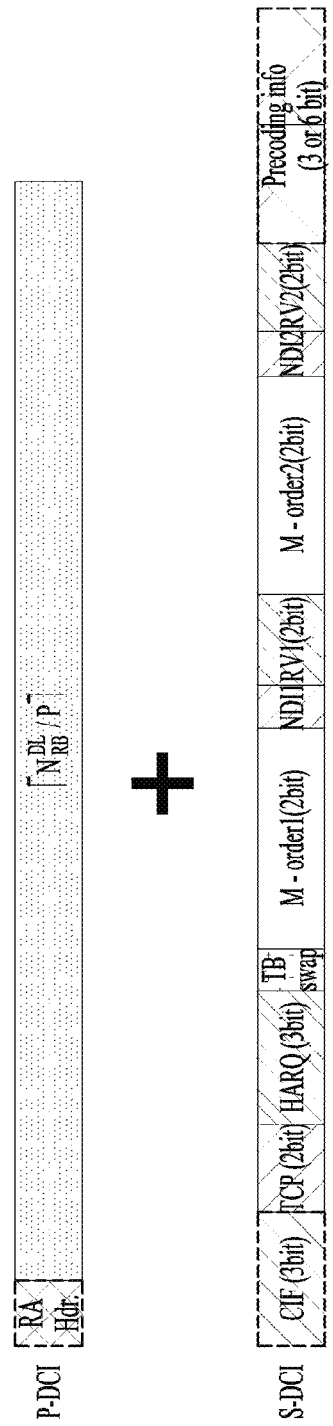
FIG. 12 is a diagram for a pairing between main control information and secondary control information according to one embodiment of the present invention.

Or, the P-DCI indicates at least one common field and the common scheduling/control information may be applied to all CCs, a designated partial CC set, or all configured CC groups. In this case, as shown in FIG. 10, it may use P-DCI including an RA field only without using the field. To this end, it may be able to inform a UE of a CC set, a CC group, and the like to which the P-DCI is applied via RRC signaling or the like. In this case, information on whether or not each CC belonging to the CC set or the CC group is scheduled may be checked by a CIF field of S-DCI.

In case of using a DCI format 1 rather than a DCI format 2, an RA type 2 is used. In this case, as mentioned in the foregoing description, an RA field using the RA type 2 may be used for P-DCI. Yet, in order to reduce blind decoding candidates of a UE, it may use an RA field having a length of an RA type 0 irrespective of an RA type. In this case, it may not use the RA type 2. Or, it may use the RA type 2 using a partial region of an RA field and the remaining space may be filled by such a method as zero padding to manage the RA type 2.

If there exist CC subgroups using a different TM in the same CC group, it may be able to use a different RA field format (e.g., RA type 0 and 2) according to each CC subgroup. In this case, if CCs use a bandwidth of the same size in the CC subgroups using a different TM and a single P-DCI is used for the entire CC group, all CCs belonging to the CC group may assume and use a specific RA type (e.g., RA type 0). The specific RA type may be defined in advance and may be configured between an eNB and a UE via RRC signaling and the like.

When a CC is not indicated as a P-DCI scheduling target, the CC may operate based on a legacy DCI structure. For example, control information on the CC may be transmitted or used based on single DCI.

S-DCI

The S-DCI includes the remaining fields except fields set to the P-DCI. 1) The S-DCI may be individually transmitted to each CC which is designated as a scheduling target by the P-DCI, or 2) individual scheduling/control information on each scheduling target CC may be transmitted via single S-DCI. In particular, the scheduling/control information transmitted via the S-DCI may be individually applied to each of designated scheduling target CCs. For example, if all CCs use TM 10 and a DCI format 2 and P-DCI contents are determined according to the aforementioned example, the S-DCI may include contents described in the following.

TPC
HARQ process number
TB swap
MCS
NDI
RV
Precoding info

The above case corresponds to an example that all CCs use the same TM in a CC group. If the CCs use a different TM, the aforementioned structure may vary according to a CC.

According to the aforementioned example, a UE decodes P-DCI transmitted from an eNB to use an RA field obtained from the P-DCI for a CC to which the P-DCI is applied. The UE decodes S-DCI transmitted from the eNB to use the remaining fields obtained from the S-DCI. In particular, the UE uses control information of the P-DCI and the S-DCI for a CC as control information according to each CC.

A control information set respectively included in the P-DCI and the S-DCI may be determined in advance. Or, an eNB may inform a UE of the control information set via RRC signaling and the like.

Two or more S-DCIs may be transmitted in a manner of being bound as single DCI. In this case, information on a part of DCI and a CC corresponding to the part should be transmitted to a UE.

Multi-subframe Scheduling for Each CC

A dual-level DCI structure consisting of the aforementioned P-DCI and the S-DCI may be applied to time domain. The P-DCI may include information common to a plurality of subframes.

1) P-DCI

An eNB may transmit a period and offset of the P-DCI to a UE using a method identical to the method of transmitting the P-DCI. The UE determines a subframe in which the P-DCI is to be detected by the UE via the period and the offset of the P-DCI and performs blind decoding on the P-DCI in the subframe only. The eNB may include information on a subframe to which the P-DCI is applied in the P-DCI. Or, the eNB may semi-statically inform the UE of the information via RRC signaling and the like. In particular, the eNB may inform the UE of information described in the following.

P-DCI transmission period
P-DCI transmission offset
P-DCI target subframe

Among the information, information on the P-DCI target subframe may be omitted. In this case, a target subframe of P-DCI information may be configured by all subframes until a timing at which next P-DCI is received.

The P-DCI may indicate at least one field. It is able to direct indicate a subframe set to which the P-DCI is applied using a bitmap.

Figure 13:
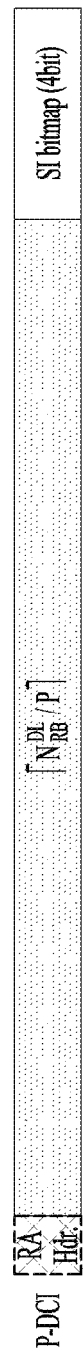
FIG. 13 is a diagram for a configuration of main control information according to one embodiment of the present invention.

Referring to FIG. 13, when P-DCI is transmitted with a period of 4 subframes, among 4 subframes in total until next P-DCI is transmitted, a specific subframe is designated as a subframe to which the P-DCI is applied. In FIG. 13, an SI bitmap (Subframe Indication bitmap) field plays a role in indicating the subframe to which the P-DCI is applied. For example, if the SI bitmap field is designated as 1101, the P-DCI is applied to a first, a second, and a fourth subframe from a subframe in which the P-DCI is transmitted.

In the aforementioned example, it may be able to indicate duration to which the P-DCI is applied using a field of 2 bits instead of the SI bitmap. In this case, if the field is set to 10, the P-DCI may be applied to 3 subframes in total including a subframe in which the P-DCI is transmitted. If a subframe set to which the P-DCI is applied is designated by signaling rather than the P-DCI, the SI field is not necessary for the P-DCI.

2) S-DCI

Figure 7:
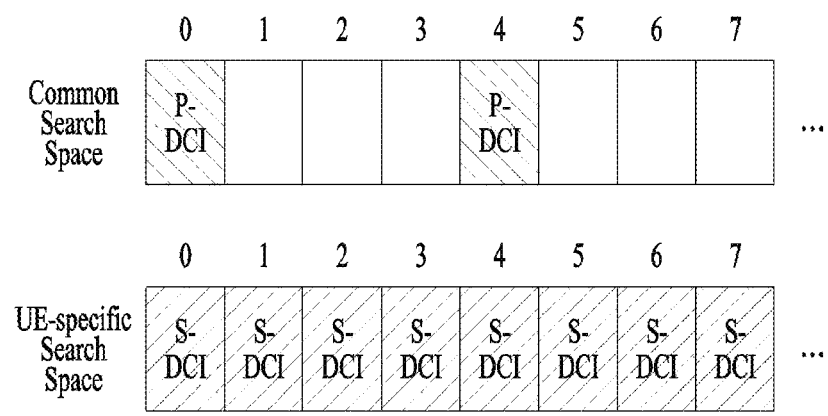
FIG. 7 is a diagram for a subframe in which main control information and secondary control information are transmitted and received and a search space according to one embodiment of the present invention.

S-DCI may include the remaining fields except a field set to P-DCI. As shown in FIG. 7, the S-DCI is transmitted according to a subframe of a scheduling target CC.

Figure 14:
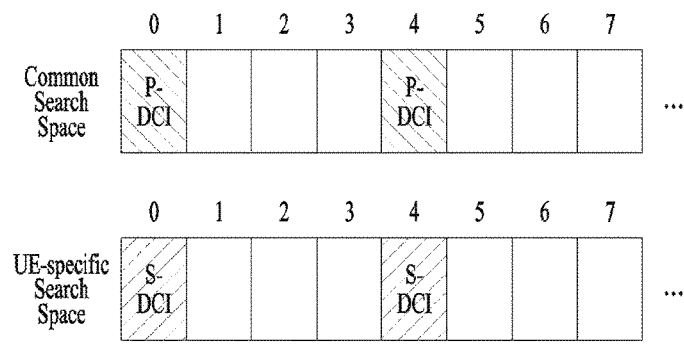
FIG. 14 is a diagram for a subframe in which main control information and secondary control information are transmitted and received and a search space according to one embodiment of the present invention.

Or, S-DCIs for a plurality of subframes may be transmitted in a manner of being bound by single S-DCI. In this case, the S-DCI may be transmitted to a subframe (e.g., a first subframe) among target subframes of the P-DCI. The S-DCI includes S-DCI on all or a part of the target subframes of the P-DCI. FIG. 14 shows an example that S-DCIs for 4 subframes are bound by single S-DCI and the S-DCI is transmitted in a first subframe among target subframes of the P-DCI.

P-DCI Missing

If a UE fails to detect or decode P-DCI, it is necessary for the UE to inform an eNB of the failure. If the UE fails to properly detect or decode the P-DCI, the UE transmits such a signal as a P-DCI missing indication to the eNB via PUCCH to ask the eNB to retransmit the P-DCI. To this end, the eNB allocates a resource (e.g., PUCCH) for reporting the P-DCI missing indication to the UE via RRC signaling and the UE may inform the eNB of whether or not the P-DCI is missed via the resource. In order to transmit HARQ-ACK feedback corresponding to each CC to which the proposed dual-level DCI-based scheduling is applied, it may allocate/use a PUCCH resource/index linked with a resource in which S-DCI or a control channel carrying the S-DCI is transmitted/detected. A PUCCH resource/index linked with P-DCI may be used as an additional resource for transmitting ACK/NACK.

Or, if an eNB receives NACK from all data of CCs belonging to a CC group to which P-DCI is applied, the eNB considers it as a P-DCI transmission failure and may be able to newly transmit P-DCI.

Figure 15:
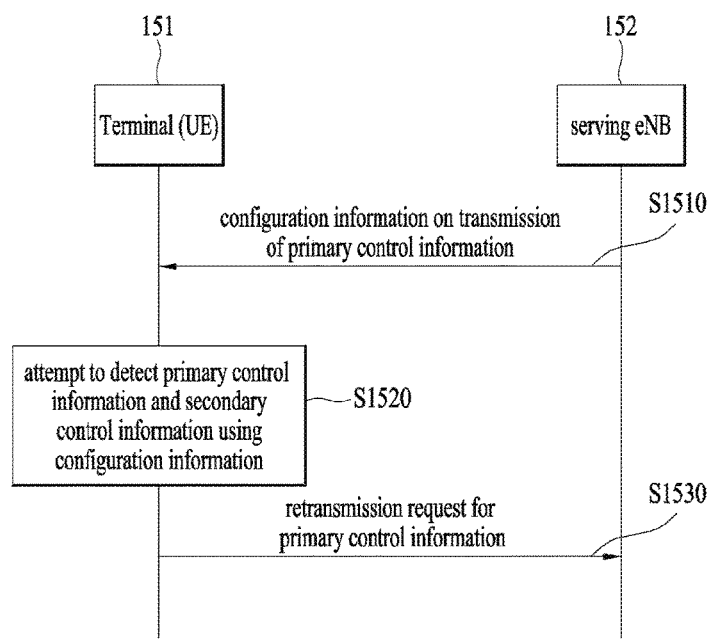
FIG. 15 is a flowchart for an operation according to one embodiment of the present invention.

FIG. 15 is a flowchart for an operation according to one embodiment of the present invention.

FIG. 15 relates to a method for a UE to which multiple component carrier groups are set to receive control information in a wireless communication system.

A UE 151 may receive configuration information for transmitting primary control information including common control information for an individual component carrier group from an eNB [S1510]. The UE may attempt to detect the primary control information for each of the multiple component carrier groups and secondary control information including individual component carrier specific control information using the configuration information [S1520].

The configuration information may include information on a transmission period and a transmission offset of the primary control information for each of the multiple component carrier groups.

The configuration information may include information on a valid period of the primary control information for each of the multiple component carrier groups. Additionally or alternatively, the primary control information for each of the multiple component carrier groups may include information on a valid period of each of primary control information. Additionally or alternatively, the primary control information for each of the multiple component carrier groups may be configured to be valid until next primary control information is received without separate information.

The primary control information for each of the multiple component carrier groups may include a field indicating one or more component carriers scheduled by the primary control information.

If the primary control information for each of the multiple component carrier groups does not include the field indicating one or more component carriers scheduled by the primary control information, the primary control information may be configured to schedule all component carriers belonging to each component carrier group.

The secondary control information is transmitted in every subframe or is transmitted with a prescribed period of a subframe unit. If the secondary control information is transmitted with the prescribed period, the secondary control information may include secondary control information on the remaining subframes included in the prescribed period. In particular, the secondary control information may include secondary control information on a plurality of subframes belonging to secondary control information transmitted or received in a subframe. The secondary control information may include a field indicating a component carrier to which the secondary control information is applied.

If the UE fails to detect primary control information, the UE may transmit a retransmission request of the primary control information to the eNB via a specific uplink resource [S1530]. The specific uplink resource may include a resource linked to a radio resource in which the secondary control information is detected.

Figure 16:
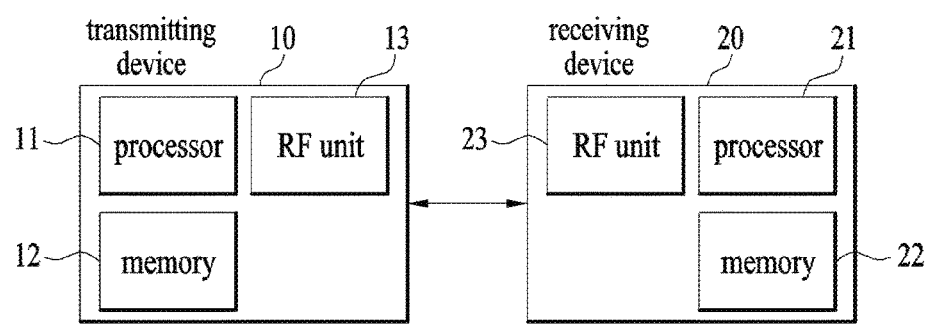
FIG. 16 is a block diagram of devices for implementing embodiment(s) of the present invention.

FIG. 16 is a block diagram of a transmitting device 10 and a receiving device 20 configured to implement exemplary embodiments of the present invention. Referring to FIG. 16, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to a wireless communication device such as a mobile terminal, relay, or base station.

What is claimed is:

1. A method for receiving control information by a terminal for which multiple component carrier groups are configured in a wireless communication system, the method comprising:
receiving, from a base station, configuration information on transmission of first downlink control information (DCI), wherein the configuration information comprises a transmission period and a transmission offset of the first DCI;
receiving, from the base station, the first DCI, wherein the first DCI comprises common scheduling information for data for a component carrier group including one or more component carriers;
receiving, from the base station, second DCI, wherein the second DCI comprises specific scheduling information for the data for one of the one or more component carriers respectively; and
attempting to detect the common scheduling information in the first DCI and the specific scheduling information in the second DCI using the configuration information.

2. The method of claim 1, wherein the configuration information further comprises information on a valid period of the first DCI for the component carrier group.

3. The method of claim 1, wherein the first DCI comprises information on a valid period of the first DCI.

4. The method of claim 1, wherein the first DCI is valid until next first DCI is received.

5. The method of claim 1, wherein the first DCI comprises a field indicating the one or more component carriers scheduled by the first DCI.

6. The method of claim 1, wherein if the first DCI does not comprise a field indicating the one or more component carriers scheduled by the first DCI, the first DCI schedules all component carriers belonging to the component carrier group.

7. The method of claim 1, wherein the second DCI is transmitted in every subframe or is transmitted with a prescribed period of a subframe unit and wherein if the second DCI is transmitted with the prescribed period, the second DCI comprises specific control information on the remaining subframes contained in the prescribed period.

8. The method of claim 1, wherein the second DCI comprises a field indicating a component carrier to which the second DCI is applied.

9. The method of claim 1, if the first DCI not detected by the terminal, further comprising transmitting a retransmission request of the first DCI to the base station via a specific uplink resource,
wherein the specific uplink resource comprises a resource linked with a radio resource on which the second DCI is detected.

10. A terminal configured to receive control information on multiple component carrier groups, the terminal comprising:
an radio frequency (RF) unit; and
a processor configured to control the RF unit, the processor further configured to:
receive, from a base station, configuration information on transmission of first DCI, wherein the configuration information comprises a transmission period and a transmission offset of the first DCI;
receive, from the base station, the first DCI, wherein the first DCI comprises common scheduling information for data for a component carrier group including one or more component carriers;
receive, from the base station, second DCI, wherein the second DCI comprises specific scheduling information for the data for one of the one or more component carriers respectively; and
attempt to detect the common scheduling information in the first DCI and the specific scheduling information in the second DCI using the configuration information.

11. The terminal of claim 10, wherein the configuration information comprises information on a valid period of the first DCI for the component carrier groups.

12. The terminal of claim 10, wherein the first DCI comprises information on a valid period of the first DCI.

13. The terminal of claim 10, wherein the first DCI is valid until next first DCI is received.

14. The terminal of claim 10, wherein the first DCI comprises a field indicating the one or more component carriers scheduled by the first DCI.

15. The terminal of claim 10, wherein if the first DCI does not comprise a field indicating the one or more component carriers scheduled by the first DCI, the first DCI schedules all component carriers belonging to the component carrier group.

16. The terminal of claim 10, wherein the second DCI is transmitted in every subframe or is transmitted with a prescribed period of a subframe unit and wherein if the second DCI is transmitted with the prescribed period, the second DCI comprises specific control information on the remaining subframes contained in the prescribed period.

17. The terminal of claim 10, wherein the second DCI comprises a field indicating a component carrier to which the second DCI is applied.

18. The terminal of claim 10, wherein if the first DCI is not detected by the terminal, the processor is configured to transmit a retransmission request of the first DCI to the base station via a specific uplink resource and wherein the specific uplink resource comprises a resource linked with a radio resource on which the second DCI is detected.

* * * * *